July 27, 1943.  E. F. FLINT  2,325,238
MICROSCOPE
Filed April 17, 1941   2 Sheets-Sheet 1
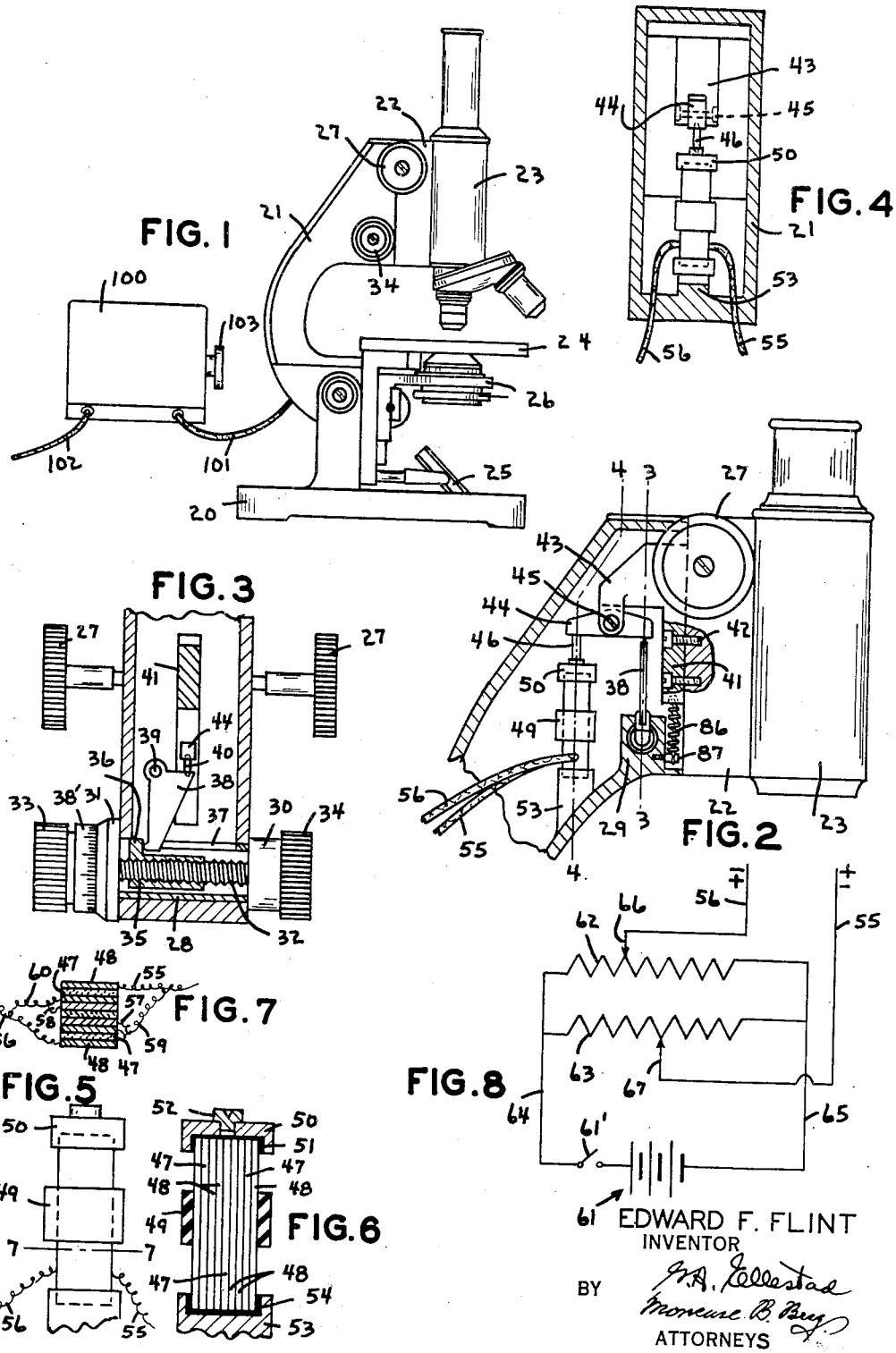
EDWARD F. FLINT
INVENTOR
BY
ATTORNEYS

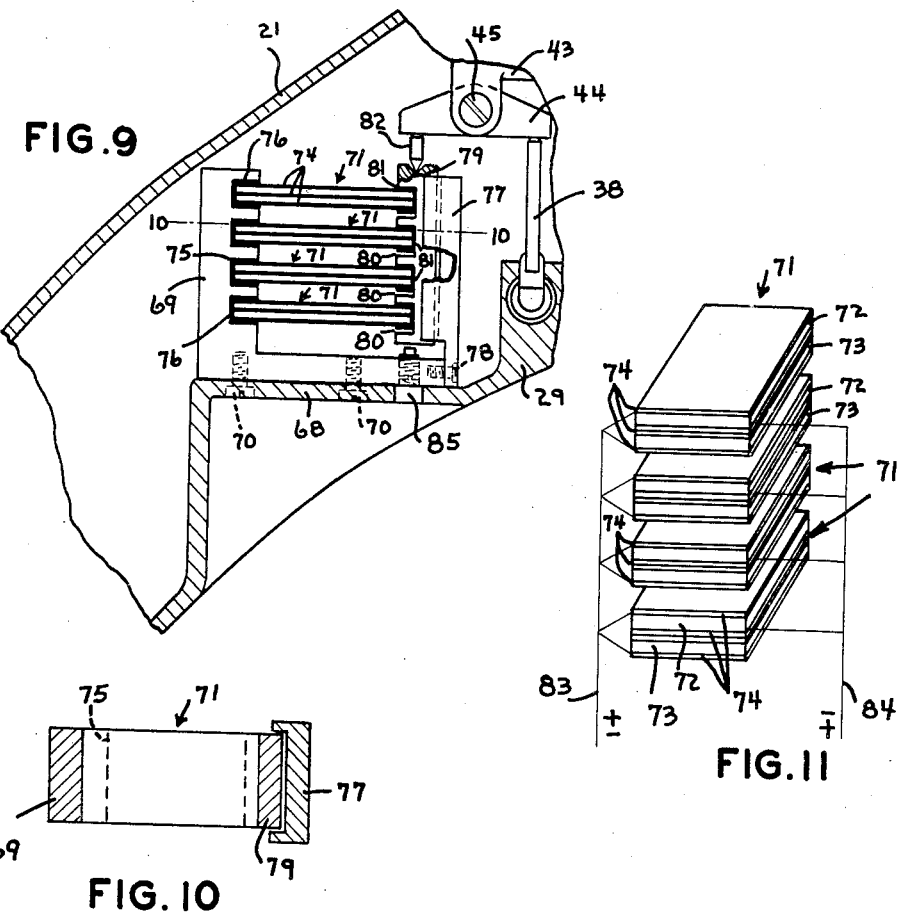

Patented July 27, 1943

2,325,238

UNITED STATES PATENT OFFICE 2,325,238

MICROSCOPE

Edward F. Flint, Brighton, N. Y., assignor to Bausch & Lomb Optical Company, Rochester, N. Y., a corporation of New York Application April 17, 1941, Serial No. 388,978

8 Claims. (Cl. 88—39)

My invention is concerned with instruments and more particularly relates to fine adjustment mechanism to be associated with an instrument, for example, with a microscope or other optical instrument.

One object of my invention is to provide an instrument with an ultra fine adjustment mechanism of extreme sensitivity and of a nature wherein the actuating hand control for the mechanism may be conveniently located where desired with reference to the instrument.

An equally important object of the invention resides in the use of a piezoelectric means for actuating fine adjustment mechanism of an optical instrument while another object intends to provide a mechanical fine adjustment mechanism as well as a piezoelectric fine adjustment mechanism which may be used independently of each other or which may be used in conjunction with each other to obtain some ultra fine adjustment of an instrument.

A further object of the invention is the provision of a piezoelectric unit, formed of one or more piezoelectric crystals, together with electric means for energizing the unit whereby it may be deformed to adjust the position of a slide block which is operatively connected thereto and which carries some part or element adapted to be moved into a desired position.

With these and other objects in view which may be incident to my improvements, the invention consists in the parts and combinations to be hereinafter set forth and claimed, with the understanding that the several necessary elements comprising my invention may be varied in construction, proportion and arrangement without departing from the spirit of the invention or exceeding the scope of the appended claims.

In order to make my invention more clearly understood, I have shown in the accompanying drawings means for carrying the same into practical effect without limiting the improvements in their useful applications to the particular constructions which, for the purpose of explanation, have been made the subject of illustration. For this purpose the invention is illustrated as follows:

Figure 1 is a side elevation of a microscope equipped with my piezoelectric fine adjustment mechanism and also shows the housing for the actuating control means.

Figure 2 is a broken away and partial sectional elevation of the microscope shown in Figure 1.

Figure 3 is a sectional view on the line 3—3 of Figure 2.

Figure 4 is a sectional view on the line 4—4 of Figure 2.

Figure 5 is a detail elevation of one form of piezoelectric unit used in my invention.

Figure 6 is a partial sectional side view of Figure 5.

Figure 7 is a sectional plan view of the piezoelectric element of Figure 5 and shows the electric lead wires connected to the element.

Figure 8 is a diagrammatic view of a practical form of electric circuit for use in conjunction with the piezoelectric fine adjustment mechanism.

Figure 9 is a view similar to Figure 2 but shows another form for the piezoelectric actuating means for the fine adjustment of the instrument.

Figure 10 is a sectional view on the line 10—10 of Figure 9.

Figure 11 is a greatly enlarged schematic view of the piezoelectric actuating means of Figure 9 and shows the electric circuit connections for the same.

In the drawings I employ like reference numerals to designate similar parts in the different views and have shown my invention embodied with an instrument such, for example, as the microscope of Figure 1. The microscope comprises a stand 20 having a hollow support or arm 21 rising therefrom and adapted to slidably support a slide block 22 from which is carried the body tube assembly 23 having the usual eyepiece, objective carrier and objectives. A suitable stage 24 is provided with the instrument. Below the stage is the usual type of plane mirror 25 and the slidably mounted substage assembly 26 which includes such accessories as a condenser, filters and the like.

In the form of microscope construction disclosed, the body tube 23 is slidably mounted on the slide block 22 in the usual manner well known to the art and is moved up and down in a vertical direction by rack and pinion means, not shown, but actuated by a knurled hand wheel 27. This type of adjusting mechanism provides the conventional coarse adjustment for a microscope and needs no detailed description.

As mentioned, the slide block 22 is slidably mounted on the support 21. To move the slide block into desired positions, I employ either a mechanical fine adjustment mechanism of any conventional design or the hereinafter described piezoelectric mechanism or a combination of both of such means to effect the desired fine focusing of the microscope.

One suitable form of mechanical fine adjustment mechanism is shown in Figures 2 and 3 and comprises a slotted sleeve 28 which extends transversely through the support 21 and is mounted in a suitable transverse projecting ledge or portion 29 formed as shown in Figure 2 on the interior of the support. Sleeve 28 is provided with end bearings 30 and 31 for rotatably supporting a threaded shaft 32, the ends of which extend beyond the bearings 30 and 31 and have knurled operating knobs 33 and 34 fixed thereto. This arrangement provides a type of endless screw construction, the threads of which engage a nut 35 having a projection 36 which extends through the slot 37 in the sleeve 28. It will be apparent that the nut 35 may be caused to move in either direction along the shaft 32 on proper rotation of either knob 33 or 34. The knob 33 is provided with an enlarged portion having a scale 38' adapted to cooperate with an index (not shown) on the bearing 31 and calibrated to indicate the movement of the slide block 22 resulting from actuation of the threaded shaft 32 and nut 35.

Means for utilizing the movement of the nut 35 to effect an adjustment of the slide block makes use of a lever 38 mounted within the support 20 on a pivot 39. The slide block 22 is supported on the lever 38 by a pin 40 which seats in a recess in the lever and is engaged in a similar recess provided in some form of bracket member fixed to the slide block. Such construction will hold the toe of the lever 38 against the projection 36 on the operating nut 35 so that movement of the latter may be caused to adjust the position of the slide block 22. This mechanical fine adjustment is somewhat similar to that set forth in Patent 2,093,611 issued to H. F. Kurtz on September 21, 1937, for a Microscope, which latter construction may be utilized with my invention following some modification of its bracket member and its operating connection between such member and its lever.

The operating connection between the lever 38 and the block 22 makes use of a bracket 41 secured to the block by means of screws 42. Bracket 41 is provided with an overhanging arm 43 which is normal to the face of the slide block 22 and has a yoke 44 pivoted thereto by a pivot screw 45. As best shown in Figure 3, the yoke 44 is provided with a recess adapted to engage one pointed end of the pin 40 whose other pointed end, as already described, is seated in a similar recess formed in the lever 38. A spring 86 is connected by suitable fastenings 87 to the bracket member 41 and to the interior of the support 21 in the manner shown and serves to take up any play in the mechanism disclosed and to constantly urge the yoke 44 downwardly into contact with the pin 40.

It will be apparent that operation of the fine adjustment screw 32 in the proper direction will cause the slide block 22 and the objectives carried therefrom to be moved up and down as desired if the end of the yoke 44 opposite the pin 40 is allowed to pivot on a fixed support point. Such a support point is provided by the pin 46, one pointed end of which is engaged in a recess in the end of yoke 44 opposite the recess for the similar pointed pin 40. The opposite end of pin 46 is engaged with the piezoelectric fine adjustment mechanism which latter when energized is adapted to move the pin 46 upwardly or downwardly in a vertical direction.

Fine focusing of the microscope is carried out by operating only one of the adjusting mechanisms at a time. Thus when the mechanical fine adjustment is operated, the pin 46 is adapted to remain in a substantially fixed position. This will permit the end of the yoke 44 adjacent the slide block 22 to be raised or lowered from its neutral position of Figure 2 on movement of the pin 40 and will simultaneously allow the end of the yoke away from the slide block to fulcrum on the fixed support provided by the pin 46. The result is to cause the slide block 22 to be raised or lowered as desired.

Pins 40 and 46 are shown as engaged by the yoke 44 at points equidistant from its pivot 45. Under these conditions it will be well understood that the slide block will be moved only one half the distance which each pin is moved by its corresponding fine adjustment mechanism. Obviously the point of application for either pin can be suitably varied to give a different movement ratio between the pins and the slide block.

In the piezoelectric means which I employ, I utilize the fact that piezoelectric material is of an electrostrictive nature so that when it is subjected to an electrostatic field it will expand along one of its axes while it will contract along a second axis which is at an angle to the first mentioned axis. If the polarity or the direction of the applied potential is reversed, then the mechanical motion of the material will also reverse. That is to say, the contraction of the crystal will take place along the just noted first mentioned axis while the expansion of the material will occur along the second mentioned axis. Irrespective of the polarity of the applied potential, the size of the dimensional changes of the crystal will vary in accordance with the magnitude of the applied potential so that not only is it possible to selectively deform a piezoelectric crystal in a desired direction along one of its axes of mechanical motion, but it is also possible to selectively control the amount of the deformation or dimensional change.

Both quartz and Rochelle salt crystals possess this property, the latter to a greater extent than any piezoelectric material now known. For this reason, Rochelle salt crystals are generally employed wherever piezoelectric material is required. While my invention is illustrated with Rochelle salt crystals, it is to be understood that I do not limit myself solely to their use, for the invention comprehends the employment of any material capable of expanding and contracting in the manner described.

A Rochelle salt crystal is known to develop its mechanical motions along axes which are located at angles of 45° from its optical and mechanical axes. Recognizing this, the art has provided methods for cutting these crystals into plates which are adapted to expand and contract in desired directions depending upon the manner in which they have been cut from their crystal.

For example, a rectangular plate may be cut from a crystal so that it will expand along its longitudinal or major geometrical axis while it will contract along its transverse or minor geometrical axis for an applied potential of a given polarity. Due to the ability of a piezoelectric plate to reverse the direction of its mechanical motions, the just described rectangular plate will expand along its transverse axis while it will contract along its longitudinal axis upon a reversal in the polarity of the potential applied to the plate. I generally employ rectangular plates although it will be understood that the invention may be effectively carried out when using plates of any other geometrical outline and even of irregular shape.

A number of plates of the just described nature are formed into a piezoelectric element which forms the piezoelectric unit shown in detail in Figures 5, 6 and 7 and which is adapted to be mounted in the instrument support 21. The single element unit is illustrated as made up of three substantially equal sized rectangular plates 47 of suitable piezoelectric material although it will be apparent that the construction of the unit is not limited to the use of any specific number of plates or to plates of any particular dimensions as to face or cross section. Each plate 47 has two electrodes 48, one cemented to each opposite face of the plate with Canada balsam, rosin, beeswax or the like.

These electrodes 48 are formed of tin foil, graphite, or other suitable conducting material and each is of an area roughly equal to that of the face of a plate 47. Generally, a piezoelectric element composed of a plurality of plates is preferred as it is well known that an element of this nature will have a greater expansion and contraction for a unit charge than will a piezoelectric element of equal cross sectional area but formed of a single plate. Use of a plurality of plates 47 permits the dielectric, that is to say the piezoelectric material, between a pair of electrodes to be of a relatively thin cross section and also provides a means for increasing the surface or contact area of the electrodes of the entire piezoelectric element.

The plates 47 of the element with the electrodes applied thereto are placed in contact with each other and are oriented so that they expand and contract along the same axes and in the same direction for an applied potential of a given polarity. Cement of the character described is employed between adjacent electrodes 48 for securing the plates 47 together to form the piezoelectric element. The assembled element is coated with a suitable moisture proofing material to provide protection against its deterioration in unusually dry or damp conditions of use.

A resilient band 49 of rubber or other suitable resilient material of an insulating character is slipped over the plates during their assembly. This band facilitates assembly of the piezoelectric element and serves at all times to firmly press the metallic electrodes on the surface of the plates 47 as well as to firmly hold the element together and to counteract any tendency of the adhesive bond between the electrodes to be broken as a result of the mechanical movement of the plates of the element.

One end of the piezoelectric unit, as shown in Figures 2 through 7 is provided with a cap 50 which is secured thereto by asphalt, wax or other suitable cement 51. The cap 50 has a bearing block 52 provided with a recess adapted to receive one of the pointed ends of the pin 46. Bearing block 52 may be formed integrally with the cap or it may be a separate member which can be secured thereto in any well known manner. It should be noted that the asphalt 51 separates the piezoelectric element from contact with the cap 50 to effectively insulate the piezoelectric element and that the bearing block 52 does not contact the plates 47 or electrodes 48. The cap and bearing block may be formed of any suitable material, either metal or some suitable plastic or one of these members may be formed of metal and the other of a plastic.

The other end of the piezoelectric unit is mounted in a boss 53 located in the instrument support 21 and is secured therein by asphalt or similar material 54. Boss 53 may be cast integrally with the support 21, which is usually formed of metal, or it may be a separate member, in which latter event it may be of metal or suitable insulating material and may be secured to the support by any conventional fastening means. As in the case of the cap 50, the asphalt 54 is adapted to form a firm seat connection for the piezoelectric unit and in addition to its adhesive function to serve as an insulator.

It will be apparent, by reason of the construction just disclosed, that when the single element piezoelectric unit is properly energized, the pin 46 may be selectively moved upwardly or downwardly by desired amounts and that a corresponding movement is transmitted to the objective carrier of the instrument. The means for energizing the piezoelectric unit makes use of a lead wire 55 which is connected to one of the outer electrodes of the element and a second lead wire 56 which is connected to the other outside electrode. Each inner electrode of the unit is connected to its contacting electrode as indicated at 57 and 58. Wire 57 is connected by a secondary lead 59 to the lead 55 while the wire 58 is connected through the secondary lead 60 to the lead 56. Thus each main lead is connected to an outer electrode and to an alternate pair of inner electrodes.

The expedient of connecting each lead to an outer electrode and to an alternate pair of inner electrodes is well understood by the art and permits each electrode of a pair of contacting electrodes to be of a positive or negative character depending upon the direction or polarity of the applied potential. This practice allows the formation of a unit having a plurality of suitably oriented plates which will simultaneously expand and contract in like directions depending upon the direction of the applied potential. Obviously, the wiring diagram which I have shown is readily adaptable to a piezoelectric unit composed of only two plates or to a unit having a greater number of plates than that which is illustrated.

The leads and wires just described are connected to the electrodes 48 in any conventional manner. Such connections are well known to the art and their particular design is not a specific part of this invention. For the sake of simplifying the drawings, the connections at the electrodes are schematically represented and their details have been omitted.

The leads 55 and 56 are adapted to connect the piezoelectric unit to a battery 61 or other source of direct current through means which permits the potential applied to the unit to be varied by desired amounts in magnitude and also to be reversed or varied as to polarity. To this end, as shown in the wiring diagram of Figure 8, two equal resistances 62 and 63 such as coils are connected in parallel to the battery leads 64 and 65, a suitable switch 61' being placed in the lead 64 for opening and closing the battery circuit. Leads 55 and 56 of the piezoelectric unit are provided, respectively, with sliders 66 and 67 which latter are adapted to contact the respective resistances 62 and 63 and by their positions on such resistances to control both the magnitude and the polarity of the potential at the electrode connections.

The electrical arrangement which I have disclosed provides a modified form of Wheatstone bridge wherein the piezoelectric means is substituted for the usual galvanometer. As will be well understood, when the resistances of a bridge of this nature are balanced, there will be no current flow through the battery leads and hence the sliders 66 and 67 will be at the same potential. However, if the sliders 66 and 67 are moved in opposite directions from their balancing position, a current will flow and the potential difference between the sliders will increase to a maximum as one of the resistances, for example the resistance 62, is entirely cut out while the other resistance 63 is connected into the battery circuit in full. As the leads 55 and 56 are connected to the sliders, this potential will be applied to the piezoelectric means. Of course, the magnitude of the applied potential may be held at any value between zero and its maximum by merely setting the sliders to cut out and cut in the particular resistance which is necessary to give an applied potential of the desired value.

On the other hand, if the sliders are moved from their last described position but in a direction to return them to their balancing position, then the applied potential at the piezoelectric means will decrease from a maximum to zero when the balancing position is reached. Continuation of this movement of the sliders beyond the balancing position will again cause an increase in the potential applied to the piezoelectric means, which potential will now increase from zero to a maximum. In this latter instance, however, it is the resistance 63 instead of the resistance 62 which is now entirely cut out of the circuit. Likewise in this instance the magnitude of the applied potential may be held at a desired value by properly setting the sliders.

The result of the just described crossing of the sliders is obviously to vary or reverse the potential applied to the piezoelectric means. Of course, the return of the sliders to their first described location on a side of their balancing position will return the polarity to that originally described. For this reason, plus and minus signs are placed opposite the lead 55 and 56 in Figure 8. As shown in that figure, the lead 56 is positive and the lead 55 is negative, because of the particular position of the sliders.

Crossing of the sliders upon proper movement beyond their balancing position will change the lead 56 to the negative lead and the lead 55 to the positive lead. Thus it will be appreciated that I am enabled to selectively vary the magnitude and the polarity of the potential applied to the piezoelectric means by suitable movement of the sliders 66 and 67, and hence to selectively control the expansion and contraction or the dimensional change of the unit by desired amounts.

The bridge arrangement shown in Figure 8 is adapted to be enclosed in a suitable housing or control box 100 which, as illustrated in Figure 1, is separate from the instrument and is movable with respect thereto. Leads 55 and 56 from the instrument may be suitably wrapped in a sheath or cover 101 and are adapted to be detachably connected to the sliders in the control box by any well known means. A similar cover 102 is provided for the battery leads 64 and 65, the control switch 61' in the battery circuit not being shown in Figure 1.

Sliders 66 and 67 are simultaneously moved in opposite directions and at equal rates by any conventional type of mechanism (not shown in the drawings) which is actuated by the operating knob 103 rotatably mounted on a side of the control box 68. The knob 103 and control box may be provided with suitable means for indicating when the sliders are in their balancing position as well as for indicating the polarity of the potential applied to the piezoelectric means.

The operation of the piezoelectric fine adjustment will be readily understood. With the piezoelectric means connected to the battery 61, suitable actuation of the operating knob 103 will cause these means to expand in a vertical direction with the result that pin 46 will cause the yoke 44 to pivot so as to raise the body tube assembly and objective carrier. As the magnitude of the applied potential is increased, there is an increase in the extent of this upward movement of the objectives until the maximum expansion of the piezoelectric means has been reached for the maximum applied potential developed by the electrical source of supply.

Decreasing the applied potential will cause the objective carrier to be lowered due to the contraction of the piezoelectric means until the potential applied to the electrodes 48 has reached a zero value which will occur when the resistances 62 and 63 are again balanced. The dimensional change of the piezoelectric means causing any of these movements may be held at any point between its limits as heretofore explained by arresting the actuation of the hand control 103.

If it is desired to lower the objective carrier by a still further amount, the sliders 66 and 67 are moved past their balancing position so as to apply a potential of a reversed polarity to the piezoelectric means. As the plates 47 have been oriented in such manner that they will contract in a vertical direction when the direction or the polarity of the applied potential is reversed from that utilized to expand the unit, it will be apparent that the objective carrier will be further lowered until this applied potential of reversed direction has reached its maximum value. However, the plates 47 will expand in a vertical direction to lift the working objective upon a decrease in the value of an applied potential of the character just noted. This lifting action, by reason of the decrease in the applied potential of such described polarity, will be arrested when the piezoelectric means is again in its unenergized condition. In the case of an applied potential of such reversed polarity the adjusted position of the working objective is again determined by the setting given to the hand control knob 103.

While the piezoelectric means may be used solely to carry out the fine adjustment of the instrument, it should be noted that the adjusting movement of such means is of a limited range. For this reason, use of the piezoelectric means is usually reserved for instances where an ultra fine focus adjustment is required. Generally, the microscope is focused in the usual manner with the coarse adjustment and the mechanical fine adjustment mechanisms. When a still finer adjustment is desired, the piezoelectric means is utilized. The value of the piezoelectric fine adjustment resides in its provision of a more sensitive focus control than is obtainable with mechanical fine adjustment mechanism and its ability to effect extremely minute and delicate changes in focus.

The usual microscopic study of an object or specimen will serve to illustrate the value of my ultra fine adjustment means. Some area or point of such a specimen is brought into focus by use of the mechanical mechanisms as described. This point or area having been studied, the specimen is moved to bring another area or point within the microscope field. Where the observation is being conducted under high magnification, the microscope will frequently lose its sharp focus on the specimen if the second point or area is in a plane which is slightly above or below that of the first point or area. Because of this, a number of refocusing operations are usually required in the thorough study of a specimen when a high power objective and eyepiece are employed.

Mechanical means heretofore developed have not been sufficiently sensitive to refocus the instrument for such conditions without considerable difficulty due to the extreme or ultra fineness of the required adjustment. For example, the art considers that focusing movement of an objective by 5 microns in a direction away from the object and by a like amount in a direction towards the object, which is to say a focusing movement through a range of 10 microns or approximately 0.0004 inch, will adequately take care of this situation. As piezoelectric means are susceptible to desired deformation caused by extremely minute dimensional changes of an easily controlled nature, it will be appreciated that such means are readily adaptable to the purpose of providing an ultra fine adjustment mechanism.

An important feature of my invention resides in the provision of a conveniently located hand control for the ultra fine adjustment mechanism. This control comprises the operating knob 103 located on the side of the control box 100 which latter may be positioned where desired with respect to the instrument. The human arm is known to become tired and cramped on extended use of an instrument having a fine adjustment actuating means which is located well above the surface upon which the instrument is supported. Not only does the expedient which I have disclosed provide a low fine adjustment actuating knob but it gives considerable freedom for location of the control box and thus provides for greater operating comfort.

Another type of piezoelectric fine adjustment mechanism, somewhat modified from that previously disclosed, is illustrated in Figures 9, 10 and 11. This form of the invention employs a mechanical fine adjustment mechanism like that already described and operatively connects the same in accordance with the practice heretofore set forth to the yoke 44 which is pivoted to the bracket 41 carried by the usual slide block from which latter the usual objective carrier is supported. A shelf 68 is provided in the support arm 21 of the instrument and has a bracket 69, which latter is adapted to support the piezoelectric means, secured thereto by screws 70.

The piezoelectric unit of Figure 9 comprises a plurality of piezoelectric elements 71 each one of which is formed of two plates 72 and 73 of suitable piezoelectric material. These plates have the usual electrodes 74 cemented to each of their faces and have their contacting electrodes cemented to each other. A suitable moisture proof material, such as that mentioned, provides a coating for each assembled element 71.

In this instance, as in the piezoelectric element of Figures 5, 6 and 7, the plates 72 and 73 are cut so that the lengthwise dimension of each plate is parallel to an axis of mechanical motion of its crystal. However, the plates 72 and 73 of each element are oriented with respect to each other so that one plate will expand while the other will contract upon applying a potential to the element. As the plates 72 and 73 are cemented to each other with their longitudinal axes parallel, it will be appreciated that if one end of an element which they form is firmly held in a horizontal position while the element is subjected to an electrostatic field, then the other end of the element will be deflected upwardly or downwardly depending upon the polarity of the applied potential.

The upright portion of the bracket 69 is provided with a plurality of recesses or slots which form seats 75. Each seat 75 is adapted to receive an end of a piezoelectric element 71 which is retained within its seat by asphalt, wax or suitable cementitious material 76, the latter also serving as an insulator between the element and the bracket 69.

Located opposite and parallel to the upright portion of the bracket 69 is an upright guide block 77 which is secured to the horizontal leg of the bracket by screws 78. The guide block 77 is provided with a suitable guideway in which the slide member 79 is movably mounted. Recessed seats 80 are provided in the face of the slide 79 which is opposite to the upright portion of the bracket 69. This expedient permits the slide 79 to be supported on the ends of the piezoelectric elements 71, an end of an element being received in each seat 80. If desired, a stop screw 85 which extends through shelf 68 may be provided to limit the movement of the slide 79 so as to protect the elements from possible harm as, for example, from shock due to jarring of the instrument.

Suitable insulating material 81 may be cemented on the end of each element 71 on which the slide member 79 is mounted. Good construction practice warrants making the seats slightly oversize as shown so as to allow the movement of the ends of the piezoelectric elements to take place freely therein. While the ends of the elements 71 move in an arc, the amount of this movement is so small that its tendency to cause the slide 79 to bind in its guideway may be neglected.

The end of the slide 79 is provided with a suitable recess for a pin 82 which completes the operating connection between the piezoelectric unit and the yoke 44 in a manner like that already disclosed. It will be apparent that the objective carrier for the instrument will be moved upwardly or downwardly by desired amounts when the multiple element piezoelectric unit of Figure 9 is subjected to a suitable electrostatic field. The means for energizing the piezoelectric unit of Figure 9 makes use of the battery and Wheatstone bridge arrangement shown in Figure 8 and connects the slider of the bridge to leads 83 and 84, which latter have been omitted from Figure 9 in order to simplify this figure.

As shown in Figure 11, the piezoelectric elements 71 are connected in parallel to the leads 83 and 84. Each plate 72 and 73 is separately connected to the lead 83 in the manner shown while a common connection is utilized between each of the plates for connecting each of the elements to the lead 84. Any conventional means is utilized to form the connection between each lead and the electrodes, such connections being only schematically shown in Figure 11. Through the use of the electrical circuit disclosed, it will be understood that the polarity of the potential applied to the piezoelectric unit may be reversed at will so that the working objective of the instrument may be moved upwardly or downwardly as desired.

Piezoelectric material is known to break down when subjected to an excessive applied potential. However, the break down points of such dielectrics are well understood by the art and I contemplate the use of an applied potential which is safely below the break down potential for the particular dielectric or piezoelectric material which may be employed in effecting my invention.

It has been indicated that relatively thin plates are preferred for forming the various piezoelectric units which have been disclosed. Quite obviously the number of plates making up a piezoelectric unit may be of any number which is sufficient to provide a cross sectional area for the piezoelectric unit capable of adequately supporting the weight of the instrument slide block and the optics carried therefrom and is in nowise limited to the particular number of plates shown in the drawings.

Throughout the drawings the ultra fine adjustment mechanism has been shown as operatively connected to the slide block which supports the objective carrier. By way of illustrating the adaptability of the invention, it will be appreciated that should the microscope stage be mounted for vertical movement, ultra fine focusing of the microscope may be obtained by adjusting the vertical position of the stage by operatively connecting it with either of the piezoelectric mechanisms which I have disclosed.

While the invention has been illustrated in connection with an optical instrument, it is to be understood that the principle of applying a piezoelectric fine adjustment to any instrument falls within the inventive concept. In fact, the use of such adjustment means is generally adaptable to the fine positioning of movable bodies. Likewise, the employment of the fine adjustment means is not limited to an optical instrument of any particular type, such as a microscope, but includes use with any optical instrument for effecting the adjustment of any mechanical or optical part thereof. In that latter connection, the term "optical part" as employed in the claims is understood to include within its scope such devices as lenses, mirrors, gratings, prisms, reticles, scales, wedges, plates, filters, specimen slides, cover plates and similar elements and comprehends the use of a single element or of a plurality of elements all of one of the types just mentioned and also comprehends any combination of such elements.

From the foregoing, it will be appreciated that I have devised a novel adjusting means for an optical instrument. These means which are of a sensitive and easily controlled nature, provide an adjusting mechanism for effecting an ultra fine adjustment of some part of the instrument, for example, the focusing of the optics thereof. Another feature of these adjusting means, which incidentally are of a simple design and construction, resides in their ability to be used by themselves or in conjunction with other fine adjustment mechanism to obtain a desired ultra fine adjustment.

I claim:

1. An optical instrument having a support, a block adjustably mounted on said support, an optical system carried by said block, a yoke pivoted on said block, mechanical means comprising a rotatable member rotatably mounted in said support and operatively connected to said yoke to effect focusing movement of said optical system and piezoelectric means carried by said support and operatively connected to said yoke to move the yoke in accordance with small dimensional changes of the piezoelectric means whereby to focus said optical system, said piezoelectric means and said mechanical means being operatively connected to said yoke on opposite sides of the pivot therefor, said piezoelectric means comprising a piezoelectric unit having a plurality of plates cut from piezoelectric material to develop mechanical motion in a direction parallel to a geometrical axis thereof, each plate provided with an electrode on its opposite faces, said plates being oriented to develop their mechanical motion in the same direction and also arranged adjacent to each other to have their electrodes in contacting relation with the exception of the outer electrodes of the unit, and an electric supply source connected to said electrodes for energizing said unit to cause desired dimensional changes therein.

2. An optical instrument comprising a support, a block slidably carried by said support, an optical part carried by said block, a yoke pivotally carried by said block, a lever pivoted on said support and operatively connected to said yoke near one end thereof to effect movement of the yoke in accordance with the movement of the lever, manually operated means carried by said support and connected to said lever for moving said lever about its pivot, piezoelectric means carried by said support and connected to said yoke to effect movement of said yoke in accordance with the dimensional change of said piezoelectric means when subjected to an electric potential, said piezoelectric means being connected to said yoke near the end thereof which is opposite the end to which said lever is operatively connected, and a source of variable potential connected to said piezoelectric means.

3. An optical instrument having a support, a block slidably carried by said support, an optical system carried by said block, a yoke pivotally carried by said block, a piezoelectric unit which expands and contracts along its longitudinal axis in accordance with a variable electric potential applied to said unit, one end of said piezoelectric unit being fixed to said support and the other end thereof being operatively connected to said yoke to effect movement of the yoke in accordance with the dimensional change of said piezoelectric unit which takes place on the application of an electric potential thereto, rotatable actuating means carried by said support and operatively connected to said yoke to effect movement of the yoke on the rotation of said actuating means, said piezoelectric unit and said rotatable actuating means being connected to said yoke on opposite sides of the pivot for the yoke, and a source of variable electric potential connected to said piezoelectric means.

4. An optical instrument having a support, a block slidably carried by said support, an optical system carried by said block, and means for adjusting the position of said block comprising a yoke pivotally carried by said block, a piezoelectric unit of the character having a fixed end and a free end which latter is flexed in accordance with an electric potential applied to the piezoelectric unit, one end of said piezoelectric unit being fixed to said support, movable means operatively connecting the free end of said piezoelectric unit to said yoke near one end of the yoke whereby to cause movement of the yoke in accordance with the flexing movement of the piezoelectric unit, rotatable actuating means carried by said support and operatively connected to said yoke near the end thereof away from that to which said movable means are connected whereby to permit movement of the yoke on the rotation of said actuating means, and a source of variable electric potential connected to said piezoelectric unit.

5. An optical instrument having a support, a block slidably carried by said support, an optical system carried by said block, and means for adjusting the position of said block comprising a yoke pivotally carried by said block, a bracket on said support, a piezoelectric unit having a plurality of elements, an end of each element fixedly secured to said bracket, each element being of the character which has its free end flexed when an electric potential is applied to the piezoelectric unit, a guide on said support, a slidable member movably carried by said guide, the free end of each element engaged to said slidable member, connecting means operatively connecting the slidable member to said yoke near one end of the yoke whereby to cause movement of the yoke in accordance with the flexing movement of said elements, rotatable actuating means carried by said support and operatively connected to said yoke near the end thereof away from that to which said movable means are connected whereby to permit movement of the yoke on the rotation of the actuating means, and a source of variable electric potential connected to said piezoelectric unit.

6. An optical instrument comprising a support, a block slidably mounted on said support, an optical part carried by said block, a yoke pivoted intermediate to the ends thereof to said block, piezoelectric means carried by said support and engaging said yoke adjacent an end thereof for moving the yoke in accordance with the deformation of said piezoelectric means when energized by an electrostatic field, an electrical supply source electrically connected with said piezoelectric means, control means for varying the potential applied to said piezoelectric means whereby to vary the deformation of said piezoelectric means, and means carried by said support engaging said yoke at the opposite end thereof and forming a fulcrum for said yoke upon application of the moving force developed by said piezoelectric means whereby the latter transmits the force to said block through its pivotal connection thereto to cause said block to slide relative to said support.

7. An optical instrument comprising a support, a block slidably carried by said support, an optical part carried by said block, a yoke pivotally carried by said block, a lever pivoted on said support and engaging said yoke near one end thereof, manually operated means carried by said support and connected to said lever for moving the same about its pivot to effect movement of the yoke in one direction in accordance with the movement of the lever, piezoelectric means carried by said support and insulatedly engaging said yoke adjacent the end opposite to the end engaged by said lever, a source of variable potential connected to said piezoelectric means, said piezoelectric means moving said yoke in a direction opposite to the movement effected by said lever in accordance with the dimensional change of said piezoelectric means when subjected to an electric potential, means for holding said yoke in engagement with said lever and said piezoelectric means, said piezoelectric means holding said yoke against pivotal movement when acted upon by said lever to cause said block to slide relative to said support, said lever holding said yoke against the pivotal movement during dimensional changes of said piezoelectric means when subjected to an electric potential whereby the force exerted against said yoke causes said block to slide relative to said support.

8. An optical instrument comprising a support, a block slidably mounted on said support, an optical system carried by said block, a yoke pivoted intermediate the ends thereof to said block, a piezoelectric unit capable of developing mechanical motion in a predetermined direction with respect to the dimension of the unit upon applying an electric potential to the unit, one end of said unit being fixed against the movement and the other end of said unit engaging said yoke adjacent an end thereof, control means for varying the potential applied to said piezoelectric means whereby to vary the deformation of said piezoelectric means, and adjustable means carried by said support, engaging said yoke at the opposite end thereof and holding said yoke against pivotal movement upon deformation of said piezoelectric means whereby the moving force developed by said piezoelectric means causes said yoke to pivot about the end engaged by said adjustable means thereby moving said block relative to said support a distance equal to substantially half of the mechanical motion of said piezoelectric means to bring about a change in the focus of the optical system carried by said block.

EDWARD F. FLINT.